Jan. 24, 1950        E. F. SCRAPER        2,495,662
ALL WEATHER PROTECTIVE VISOR FOR MOTOR VEHICLES
Filed July 29, 1947        2 Sheets-Sheet 1
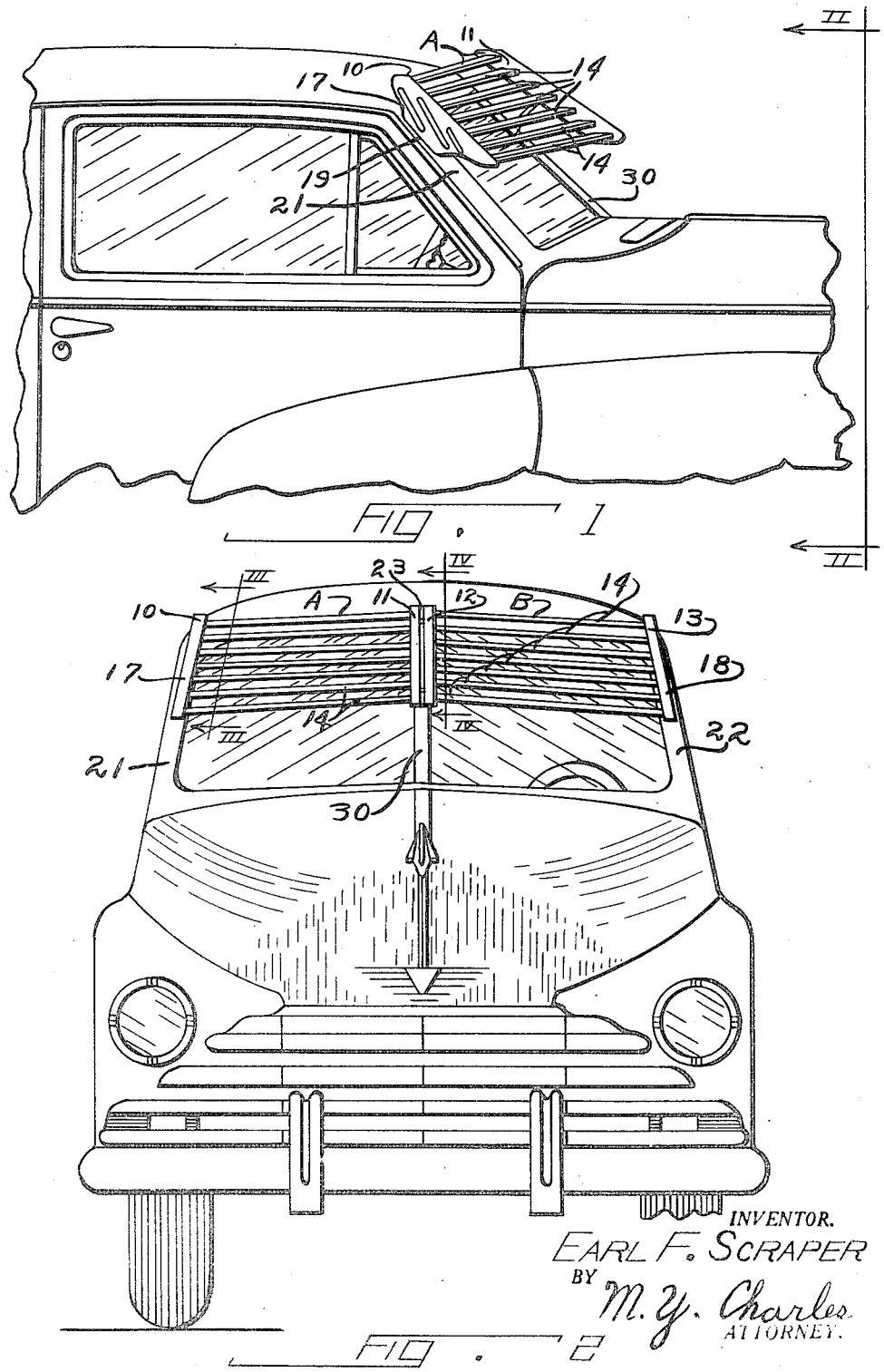
INVENTOR.
EARL F. SCRAPER
BY M. Y. Charles
ATTORNEY.

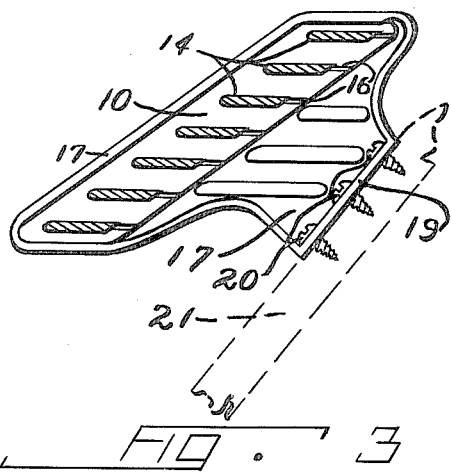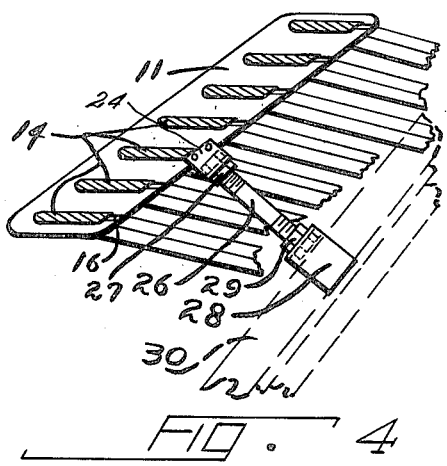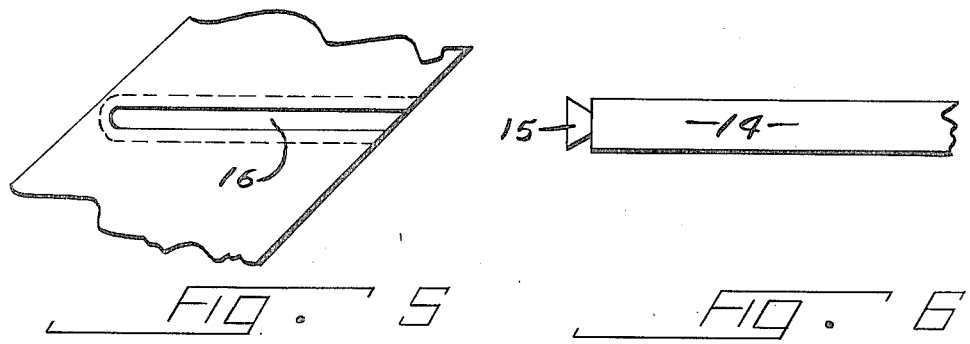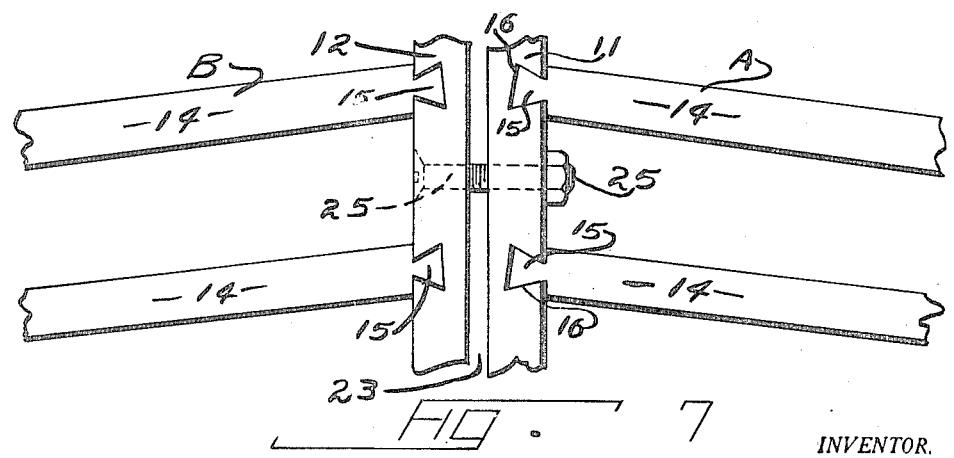

Patented Jan. 24, 1950

2,495,662

UNITED STATES PATENT OFFICE 2,495,662

ALL-WEATHER PROTECTIVE VISOR FOR MOTOR VEHICLES

Earl F. Scraper, Wichita, Kans.

Application July 29, 1947, Serial No. 764,325

2 Claims. (Cl. 296—95)

1

My invention relates to an improvement in all-weather protective visors for motor vehicles.

An object of my invention is to provide a visor of the kind mentioned that is neat and attractive in appearance, one that is sturdy and substantial, and one having openings therethrough so as to not materially obstruct the line of vision of the driver or occupants of the vehicle and yet shield the windshield of the vehicle from snow or rain and the like and to more particularly shield the eyes of the occupants of the vehicle from the rays of sunshine as the sun is comparatively low in the sky.

Another object of the device is to provide a visor of the kind mentioned having details of construction whereby the device is extremely rigid and will not come apart due to age and vibration that the device may be subjected to on the vehicle.

The construction of the device is also such that water from rain or melting snow will not enter the joints of the device so as to rot or soak up the material from which the device is made and cause the joints to break or come apart.

These and other objects will be more fully explained as this description progresses.

Now referring to the accompanying drawings in which similar numerals of reference designate the same parts throughout the several figures of the drawings, Fig. 1 is a side view of an automobile body showing the visor in place over the windshield thereof.

Fig. 2 is a front view of an automobile and showing the visor in place over the windshield thereof.

Fig. 3 is an enlarged detail sectional view through the visor, the view being as seen from the line III—III in Fig. 2 and looking in the direction of the arrows.

Fig. 4 is an enlarged detail sectional view through the visor, the view being as seen from the line IV—IV in Fig. 2 and looking in the direction of the arrows.

Fig. 5 is an enlarged detail fragmentary side view of one of the end rails of the visor.

Fig. 6 is an enlarged detail view showing the end construction of the visor louver.

Fig. 7 is a rear view of the central portion of the visor, showing the section connections thereof and the method of joining the louvers into the end rails of the visor sections.

Most of the present day automobiles have windshields that are made in two sections that abut each other in a manner to form an obtuse angle, therefore to conform with this formation, my improved visor device consists of two sections A and B, that are positioned end to end and at an angle conforming to that of the windshield sections. The visor section A has end rails 10 and 11 and the section B has similar end rails 12 and 13 that are preferably made of wood or of such material as can be worked similarly to wood. Between the end rails 10 and 11, 12 and 13 is positioned a plurality of spaced apart and downwardly and forwardly sloping louver elements 14, the ends of each louver is angularly cut and provided with a dovetail formation 15 that is tightly received in dovetail grooves 16 that are so positioned in the end rails 10 and 11, 12 and 13 that when the sections A and B are positioned before the windshield of the car that the louvers 14 are held substantially in parallelism with the windshield glass of their respective section A or B in a downward and forward tilted and forwardly stepped position with the end rails 10 and 11, 12 and 13 sloped downwardly and forwardly and the depth dimension of the end rails 10, 11, 12 and 13 lie in plains parallel with the longitudinal center axis of the vehicle.

The end rails 10 and 13 are substantially held in supporting brackets 17 and 18, each of which have a supporting leg 19 that may be rigidly attached by means of bolts or screws 20, to the corner posts 21 and 22 of the vehicle body at either side of the windshield so as to rigidly hold the end rails 10 and 13 of the visor sections A and B in similar downwardly and forwardly directed positions. The end rails 11 and 12 are also held in a downwardly and forwardly sloping position similar to the end rails 10 and 13 and are positioned parallel with each other end are slightly spaced apart as shown at 23. In the open space 23 is positioned one end of a support bracket 24 that is rigidly attached by means of screws, to one of the end rails 11 or 12. The bracket 24 having thus been mounted, the two end rails 11 and 12 are then bolted together by means of bolts 25 to make a rigid visor assembly of the two sections A and B.

One end of a support rod 26 is threaded into the bracket 24 and a lock nut 27 is threaded on the support rod 26 to bear against the bracket 24 to lock the support rod 26 in its adjusted position as will be readily understood.

A second support rod bracket 28 is threaded on the other end of the support rod 26 and a lock nut 29 is threaded on the lower end of the support rod 26 and may be turned to bear against the support bracket 28 to further lock the support rod 26 in its adjusted position.

The support bracket 28 is bifurcated and the legs thereof rest on and clamp to the division rail 30 of the vehicle windshield.

The slope of the louvers 14 and their spacing apart is such that they will drain water from rain from one onto the other from top to bottom and the space between the louvers is such that a line of vision may pass there between and the louvers will offer little obstruction of the vision through the visor.

The slope of the louvers is such that when the sun is low in the sky the louvers will cast a shadow each on the one therebelow and thereby stop the direct ray of the sun from shining into the eyes of the driver or occupants of the vehicle to blind them.

In assembling the louvers 14 in the side rails 10, 11, 12 and 13, the dove tail grooves 16 and the dove tails 15 are coated with a waterproof glue or cement and the entire wooden parts of the visor are varnished or painted, whereby all the joints are made tight or waterproof.

Such modifications of my invention may be employed as lie within the scope of the appended claims without departing from the spirit and intention of the invention.

Now having fully shown and described my invention, what I claim is:

1. In a visor device of the kind described; the combination of two visor sections, each of said sections having a center end rail and a bracket attachment end rail, and a plurality of louver elements, the ends of said louvers being dovetailed into their respective center end rail and supporting bracket end rail, the rails of each of said sections being positioned in parallelism with each other and being positioned obliquely in respect to the linear dimension of the said louvers, a pair of supporting brackets, said supporting brackets being positioned, one at either side of the visor assembly and attached to the said bracket attachment rails of the visor, said brackets being attachable to the side parts of a windshield frame, the adjacent center end rail of said sections being spaced apart, and center support means for the said centerspaced end rails of the visor, said support extending between and being attached to the center rails of the visor and a center support element of the windshield, and means for adjusting the length of the visor center support for alignment of the visor sections.

2. In a visor device of the kind described; the combination of structure and assembly as defined in claim 1, said combination being further characterized by the rails at each end of both visor sections sloping forwardly and downwardly from top to bottom, and the louvers in each section being spaced apart in parallelism with each other, and each successive louver being stepped, one in advance of the other from top to bottom of their respective visor section.

E. F. SCRAPER.

REFERENCES CITED

The following references are of record in the file of this patent:

UNITED STATES PATENTS

| Number | Name | Date |
| --- | --- | --- |
| 1,419,322 | Smith | June 13, 1922 |
| 1,565,381 | Martin | Dec. 15, 1925 |
| 2,334,856 | Atkinson | Nov. 23, 1943 |